United States Patent
Matsuo

(10) Patent No.: US 8,355,182 B2
(45) Date of Patent: Jan. 15, 2013

(54) IMAGE SCANNER AND COPIER

(75) Inventor: Takeshi Matsuo, Nara (JP)

(73) Assignee: Kyocera Document Solutions Inc. (JP)

( * ) Notice: Subject to any disclaimer, the term of this patent is extended or adjusted under 35 U.S.C. 154(b) by 546 days.

(21) Appl. No.: 12/400,570

(22) Filed: Mar. 9, 2009

(65) Prior Publication Data

US 2009/0244650 A1    Oct. 1, 2009

(30) Foreign Application Priority Data

Mar. 25, 2008 (JP) .................................. 2008-077551

(51) Int. Cl.
*H04N 1/04* (2006.01)

(52) U.S. Cl. .................... 358/474; 358/1.15; 358/1.1

(58) Field of Classification Search ............... 358/1.1, 358/1.9, 1.14, 474
See application file for complete search history.

(56) References Cited

U.S. PATENT DOCUMENTS

| | | | | |
|---|---|---|---|---|
| 5,344,134 | A * | 9/1994 | Saeki et al. ................. | 271/122 |
| 5,412,462 | A | 5/1995 | Matsuo et al. ............... | 355/308 |
| 2003/0231358 | A1 * | 12/2003 | Haas et al. ................... | 358/498 |
| 2010/0149602 | A1 * | 6/2010 | Tamai et al. ................. | 358/403 |

FOREIGN PATENT DOCUMENTS

| | | |
|---|---|---|
| JP | 3600575 B2 | 12/2004 |
| JP | 3898069 B2 | 3/2007 |

OTHER PUBLICATIONS

Office Action dated Mar. 30, 2011 issued in corresponding Chinese Patent Application No. 200910127051.X.

* cited by examiner

*Primary Examiner* — King Poon
*Assistant Examiner* — Iriana Cruz
(74) *Attorney, Agent, or Firm* — Ostrolenk Faber LLP

(57) ABSTRACT

An image scanner of the present invention includes a document feeder, a first scanning section, a start reception section, and a single mode execution section. The document feeder is configured to feed a sheet of document. The first scanning section is configured to scan an image on the document during movement of the document. The start reception section is configured to receive an instruction to start scanning the image on the document from a user. The single mode execution section is configured to execute a single mode to cause the document feeder and the first scanning section to perform scanning of an image on the document every time the start reception section receives the start instruction.

4 Claims, 11 Drawing Sheets

IMAGE SCANNER AND COPIER

CROSS-REFERENCE TO RELATED APPLICATIONS

This application claims priority under 35 U.S.C. §119 to Japanese Patent Application No. 2008-077551 filed on Mar. 25, 2008. The entire disclosure of Japanese Patent Application No. 2008-077551 is hereby incorporated herein by reference.

BACKGROUND OF THE INVENTION

1. Field of the Invention

The present invention relates to an image scanner for scanning an image on a sheet of document and a copier for printing the scanned image on a sheet of printing paper.

2. Background Art

Conventional printers have been configured to scan images of a plurality of documents on a document disposition plate one by one and perform printing (i.e., copying) based on the scanned images. Specifically, Japan Patent Publication Nos. 3898069 and 3600575 disclose printers having an automatic document feeder (ADF) for automatically feeding a sheet of document. The printers are capable of automatically and consecutively scanning a plurality of documents. Therefore, the printers are suitable for mass copying of a sheet of a document.

However, the conventional art has the following drawbacks. When a plurality of documents is placed on a document disposition plate, one of the documents may be put in a wrong order or a wrong orientation. In this case, when image data are obtained or the obtained image data are printed out, the image data or printed materials are inappropriately ordered with respect to the wrong-ordered document and the subsequent documents. Also, when an image of the wrongly oriented document is printed on a sheet of printing paper, the image will be misaligned. However, when using an automatic feeder function, a user does not easily notice the problems.

If a user sets a plurality of documents on the document disposition plate one by one, the troubles may be prevented. However, the task increases the user's burden especially in putting a large number of documents on the document disposition plate.

In view of the above, it will be apparent to those skilled in the art from this disclosure that there exists a need for an improved image scanner and copier. This invention addresses this need in the art as well as other needs, which will become apparent to those skilled in the art from this disclosure.

SUMMARY OF THE INVENTION

Accordingly aspects of the present invention have been created to solve the above-mentioned problems occurring in the conventional practice, and to produce an art for effectively preventing failure of scanning, copying and the like and for letting a user notice occurrence of the failure in an early stage.

An aspect of the present invention relates to an image scanner. The image scanner includes a document feeder, a first scanning section, a start reception section, and a single mode execution section. The document feeder is configured to feed a sheet of a document. The first scanning section is configured to scan an image on the document during movement of the document. The start reception section is configured to receive an instruction to start scanning the image on the document from a user. The single mode execution section is configured to execute a single mode to cause the document feeder and the first scanning section to perform scanning of the image on the sheet of paper every time the start reception section receives the start instruction.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

A. First Embodiment

A first embodiment of the present invention will be hereinafter explained with reference to the figures. A multifunction peripheral (MFP) 1 is hereinafter exemplified as an embodiment of the present invention. However, the present invention is not limited to this, and may be applied to an image scanner without a printing function.

A-1. General Configuration of MFP 1

Figure 1:
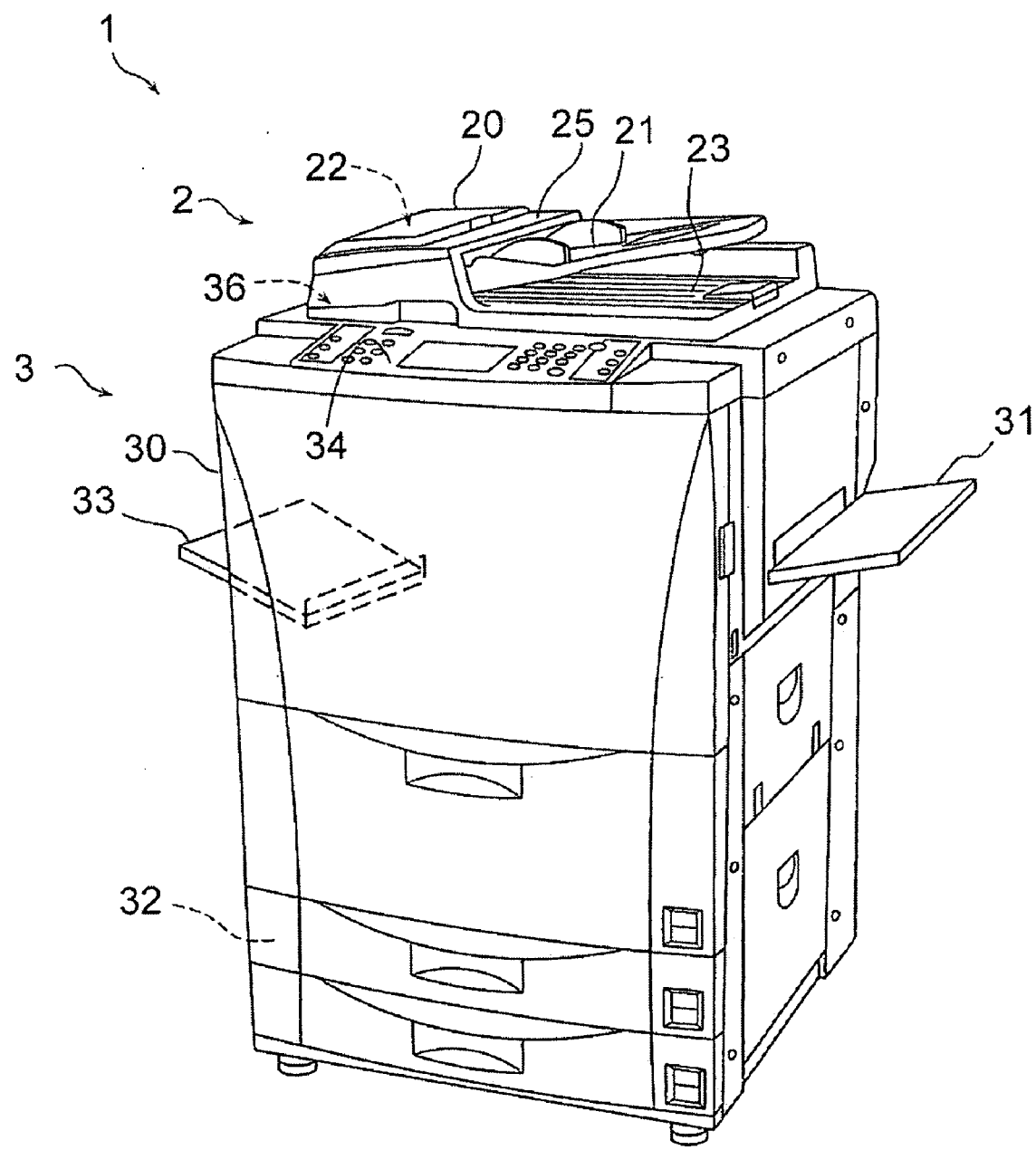
FIG. 1 is a perspective view of a multifunction peripheral (MFP) of a first preferred embodiment of the present invention and illustrates its appearance.
Figure 2:
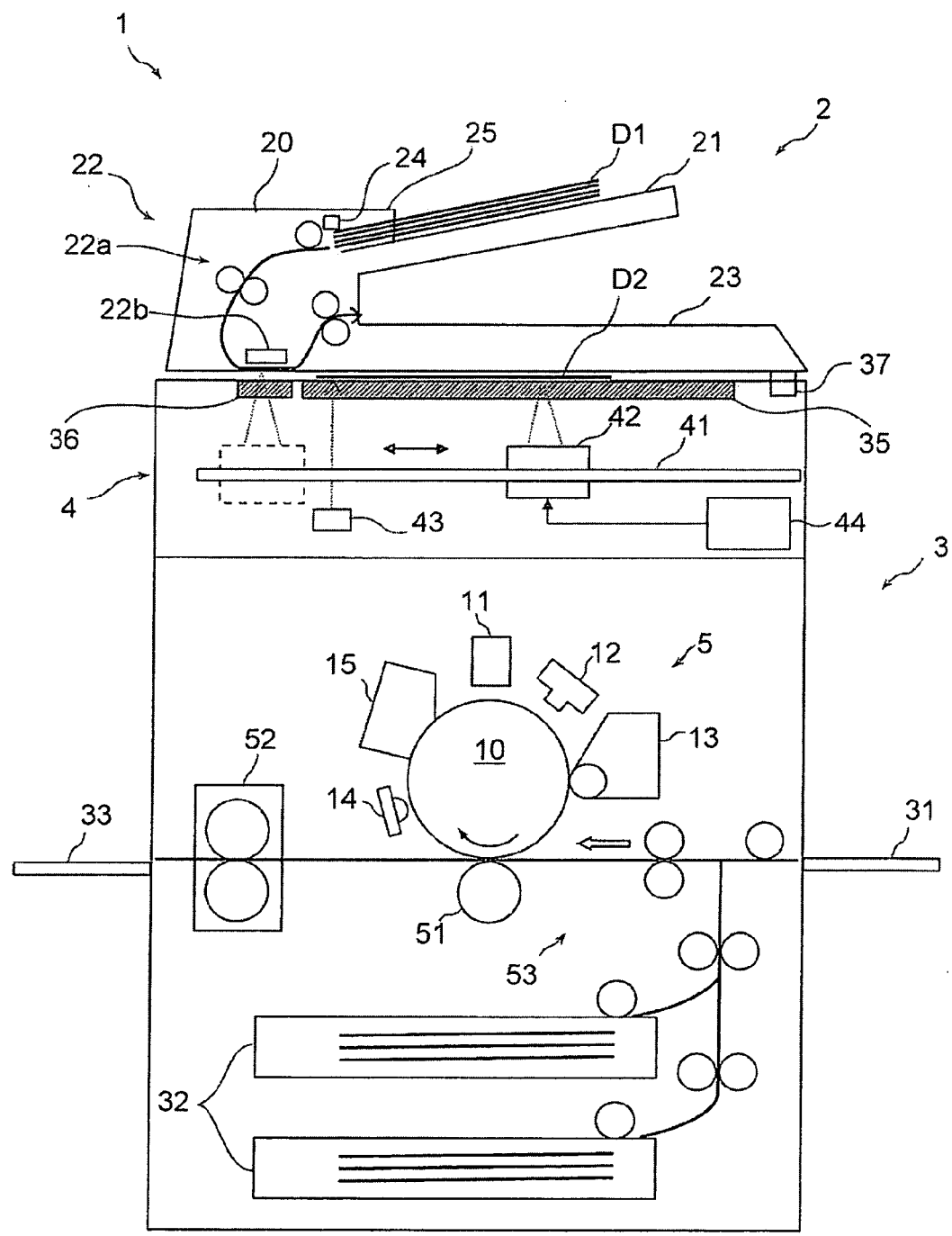
FIG. 2 is a front cross-sectional schematic view of the MFP and illustrates main elements in the interior of the MFP.

General configuration of the MFP 1 of the first embodiment will be explained with reference to FIGS. 1 and 2. FIG. 1 is a perspective view of the MFP 1 and illustrates its appearance. FIG. 2 is a front cross-sectional schematic view of the MFP 1 and illustrates main elements disposed therein.

As illustrated in FIGS. 1 and 2, the MFP 1 includes a document feeder 2 to feed sheets of a document and a main body 3. Note that a symbol "D1" is given to sheets of a document to be fed by the document feeder 2 whereas a symbol "D2" is given to sheets of a document to be put on the top of the main body 3. The document feeder 2 is configured to move the document D1 to an after-mentioned image scanning section 4 (first and second scanning section). The main body 3 includes the image scanning section 4, a printing section 5, and the like. The image scanning section 4 is configured to scan images on the document D1 and D2. The printing section 5 is configured to print out the scanned image data on a sheet of printing paper. Details of the elements will be explained below.

A-2. Document Feeder 2

As illustrated in FIGS. 1 and 2, the document feeder 2 includes a feeder housing 20, a document feed tray 21, a document feeding section 22 a document discharge tray 23, and the like. The document feed tray 21 is attached to the outside of the feeder housing 20. The document feeding section 22 is disposed in the interior of the feeder housing 20.

The feeder housing 20 is fixed to a housing 30 of the main body 3. The feeder housing 20 is configured to be set in opened and closed positions. Specifically, the feeder housing 20 makes contact with after-mentioned first and second platen glasses 35 and 36 in the closed position whereas not making contact with them in the opened position. Thus, the feeder housing 20 covers the first and second platen glasses 35 and 36 of the main body 3 in the closed position. Therefore, the feeder housing 20 functions as a document presser to press the document D2 toward the first platen glass 35.

A part of the feeder housing 20 covers the document feed tray 21 as a document holder member 25. When the feeder housing 20 is set in the opened position while the document D1 is put on the document feed tray 21, the document holder member 25 holds the document D1 on the document feed tray 21.

As illustrated in FIG. 2, the document feeder 2 feeds the document D1 from the document feed tray 21 to an opposed position to the second platen glass 36. In this case, the front surface of the document D1 on the document feed tray 21 is turned to face the second platen glass 36. In other words, the document D1 is put on the document feed tray 21 while the front surface with an image faces up.

The document discharge tray 23 is disposed below the document feed tray 21.

As illustrated in FIG. 2, the document feeding section 22 includes a group of document feeding rollers 22a and a document presser 22b. The document feeding rollers 22a are composed of a plurality of rollers. When the document feeding rollers 22a rotate, the sheets of the document D1 on the document feed tray 21 are accordingly pulled in the interior of the feeder housing 20 one by one. Then, the pulled document D1 is discharged to the document discharge tray 23 via the opposed position to the second platen glass 36. The document presser 22b presses the document D1 toward the second platen glass 36 while the document D1 is being fed by the document feeding rollers 22a. Accordingly, the image scanning section 4 is configured to scan an image on the front surface of the document D1. Note that the document D1 in feeding is also hereinafter referred to as "an automatic feeding document."

A-3. Main Body 3

A-3-1. General Configuration of Main Body 3

As illustrated in FIGS. 1 and 2, the main body 3 includes the approximately rectangular-cuboid housing 30. The housing 30 accommodates the image scanning section 4, the printing section 5, a manual feeding tray 31, paper cassettes 32, a paper discharge tray 33, an operation panel 34, the first and second platen glasses 35 and 36, an open/close sensor 37, and the like. The image scanning section 4 is configured to obtain image data by scanning images on the documents D1 and D2. The printing section 5 is configured to print out an image onto a sheet of printing paper based on the image data. The manual feeding tray 31 is arranged to put a sheet of printing paper thereon. The paper cassettes 32 accommodate a single or plurality of sheets of paper, respectively. The paper discharge tray 33 is arranged to put a sheet of printed paper thereon. The operation panel 34 is configured to receive an instruction from a user and to display a variety of information for a user. The first and second platen glasses 35 and 36 are disposed on the top of the housing 30. The open/close sensor 37 is configured to detect a contact with the feeder housing 20. Accordingly, it is possible to detect the opened/closed position of the feeder housing 20.

The first platen glass 35 is an example of a platen. Note that the document D2 put on the first platen glass 35 is also hereinafter referred to as "a static document" to distinguish it from the above-mentioned automatic feeding document.

A-3-2. Image Scanning Section 4

As illustrated in FIG. 2, the image scanning section 4 is disposed in the interior of the housing 30. More specifically, the image scanning section 4 is arranged in the vicinity of the first platen glass 35. The image scanning section 4 includes a rail 41, a carriage 42, and a carriage driving section 44. The rail 41 is disposed in parallel to the first platen glass 35. The carriage 42 is configured to move on the rail 41 in the directions of a left-right arrow in FIG. 2. The carriage driving section 44 is configured to move the carriage 42. Note that a direction in parallel to the rail 41 is hereinafter referred to as "a sub-scanning direction" whereas a direction vertical to the rail 41 and in parallel to the first platen glass 35 is hereinafter referred to as "a main-scanning direction."

The carriage 42 accommodates a light source, a group of mirrors, a collective lens, a charge coupled device (CCD) image sensor, and the like (not illustrated in the figure). In this case, a variety of lamps (e.g., a light-emitting diode (LED) and a xenon lamp) may be used as the light source. The light source is arranged to irradiate the front surface of the document D2 (i.e., the surface with an image) via the first and second platen glasses 35 and 36. A plurality of mirrors of the group of mirrors is arranged to reflect sequentially the light reflected by the document D2 and then to guide the reflected light to the collective lens. The collective lens is arranged to collect the light to the CCD. The CCD is configured to convert the collected light into an electric signal. Note that the CCD is only an example of an image sensor and any other suitable image sensors (e.g., a complementary metal-oxide semiconductor (CMOS) image sensor) may be used instead of it.

The carriage driving section 44 includes a motor, a gear, and the like.

When an image on the static document D2 is scanned, the carriage driving section 44 moves the carriage 42 in the sub-scanning direction. Thus, the front surface of the document D2 is entirely scanned.

Also, when an image on the automatic feeding document D1 is scanned, the carriage driving section 44 moves the carriage 42 to an opposed position to the second platen glass 36 (see dashed line in FIG. 2). While the carriage 42 stops at this position, the document feeding section 22 moves the document D1 to the oppose position to the second platen glass 36. Thus, the scanning in the sub-scanning direction is executed.

A-3-3. Printing Section 5

Next, the printing section 5 will be explained with reference to FIG. 2. As illustrated in FIG. 2, the printing section 5 includes a photosensitive drum 10, an electrostatic charging device 11, an exposing device 12, a developing device 13, a neutralization device 14, a cleaning device 15, and the like. The photosensitive drum 10 is preferably formed in a columnar shape and is configured to rotate. The electrostatic charging device 11 is configured to charge uniformly the photosensitive drum 10 along a rotational direction thereof (see an arrow in FIG. 2). The exposing device 12 is configured to form an electrostatic latent image on the photosensitive drum 10 by irradiating the charged photosensitive drum 10. The developing device 13 is configured to form a toner image by developing the electrostatic latent image with developer. The neutralization device 14 is configured to neutralize the charged photosensitive drum 10 after the toner image is transferred onto a sheet of printing paper. The cleaning device 15 is configured to remove toner remaining on the photosensitive drum 10 after transference.

Note that the MFP 1 may be provided with a plurality of printing sections 5 (especially a plurality of developing devices 13). Also, in the present embodiment, a two-component developer composed of toner and carrier is preferably used as the developer. However, one-component developer and any other suitable developers may be used as needed.

The printing section 5 further includes a transference section 51, a fixation device 52, and a paper feeding part 53. The transference section 51 is configured to transfer the toner image formed on the photosensitive drum 10 onto a sheet of printing paper. The fixation device 52 is configured to fix the toner image transferred onto the sheet of printing paper with heat and pressure. The paper feeding part 53 is configured to feed a sheet of printing paper from the manual feeding tray 31 or one of the paper cassettes 32 to the paper discharge tray 33 via the transference section 51 and the fixation device 52. Also, the transference section 51 is preferably arranged downstream of the developing device 13 and upstream of the neutralization device 14 in the rotational direction of the photosensitive drum 10.

A-3-4. Operation Panel 34

Figure 3:
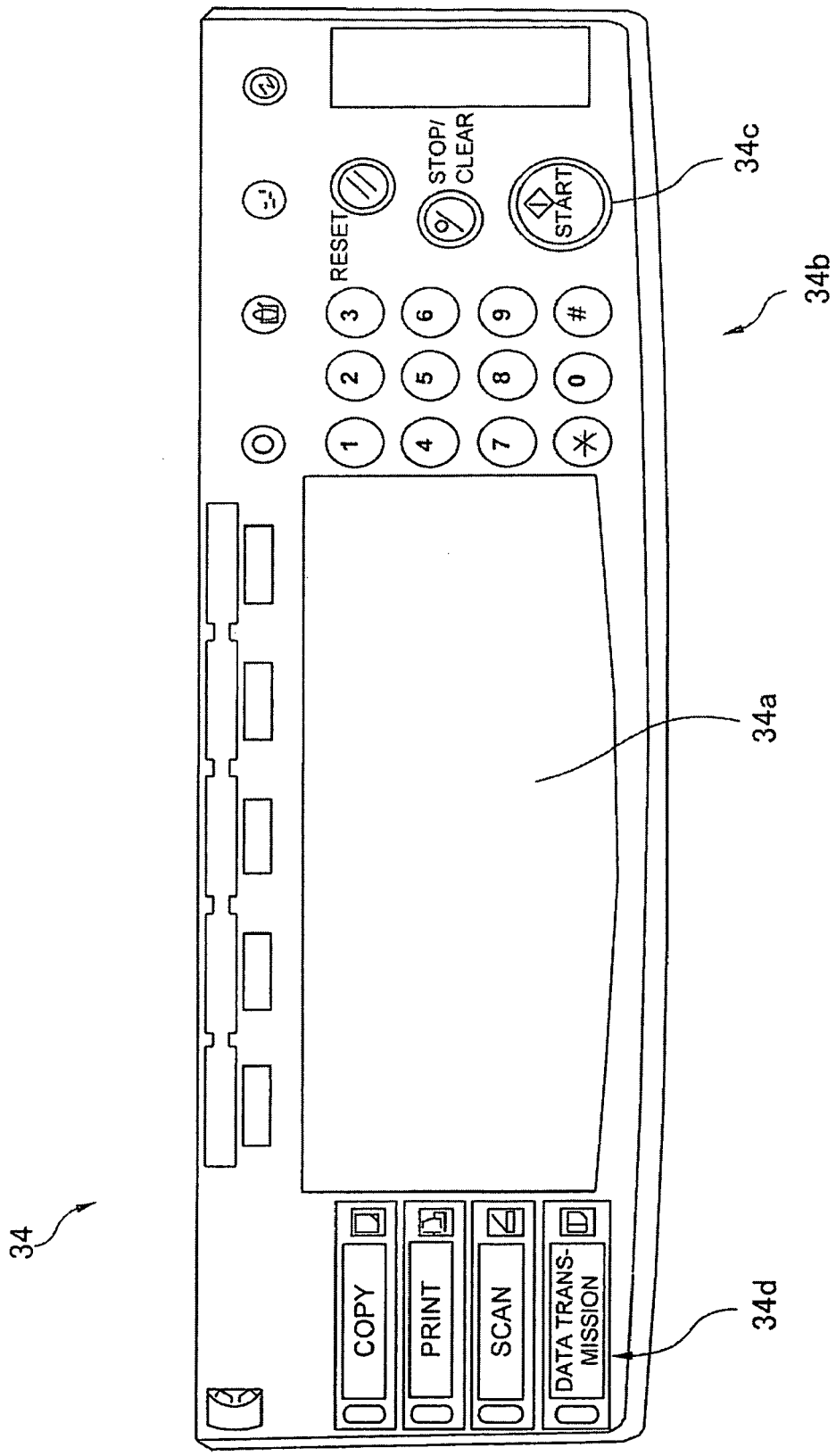
FIG. 3 is a plan view of all operation panel of the MFP and illustrates its overview.

Next, general configuration of the operation panel 34 will be explained with reference to FIG. 3. FIG. 3 is a plan view of the operation panel 34 and illustrates its general configuration.

As illustrated in FIG. 3, the operation panel 34 preferably includes a touch panel 34a (selection reception section), a group of hard keys 34b and the like. The hard keys 34b include a start key 34c (start reception section), function selection keys 34d, ten keys, a stop/clear key, a reset key, and the like. The touch panel 34a is composed of a liquid-crystal display (LCD) panel and a touch sensor. The function selection keys 34d include keys corresponding to functions of copying, printing, scanning, and data transmission.

A-3-5. Sensor Related Elements

Referring again to FIG. 2, the MFP 1 includes a first document sensor 24 and a second document sensor 43. The first document sensor 24 is arranged to detect the document D1 put on the document feed tray 21. An optic sensor, a contact sensor, or the like is preferably used as the first document sensor 24. The first document sensor 24 is disposed in the interior of the feeder housing 20. On the other hand, the second document sensor 43 is disposed in the interior of the housing 30. The second document sensor 43 is opposed to the first platen glass 35 to detect whether the document D2 has been placed on the first platen glass 35. An optic sensor or the like is used as the second document sensor 43. Also, the above-mentioned CCD may also function as the second document sensor 43. The first and second document sensors 24 and 43 detect the documents D1 and D2, respectively, and transmit detection signals to a control unit 6.

A-4. Control Elements

Figure 4:
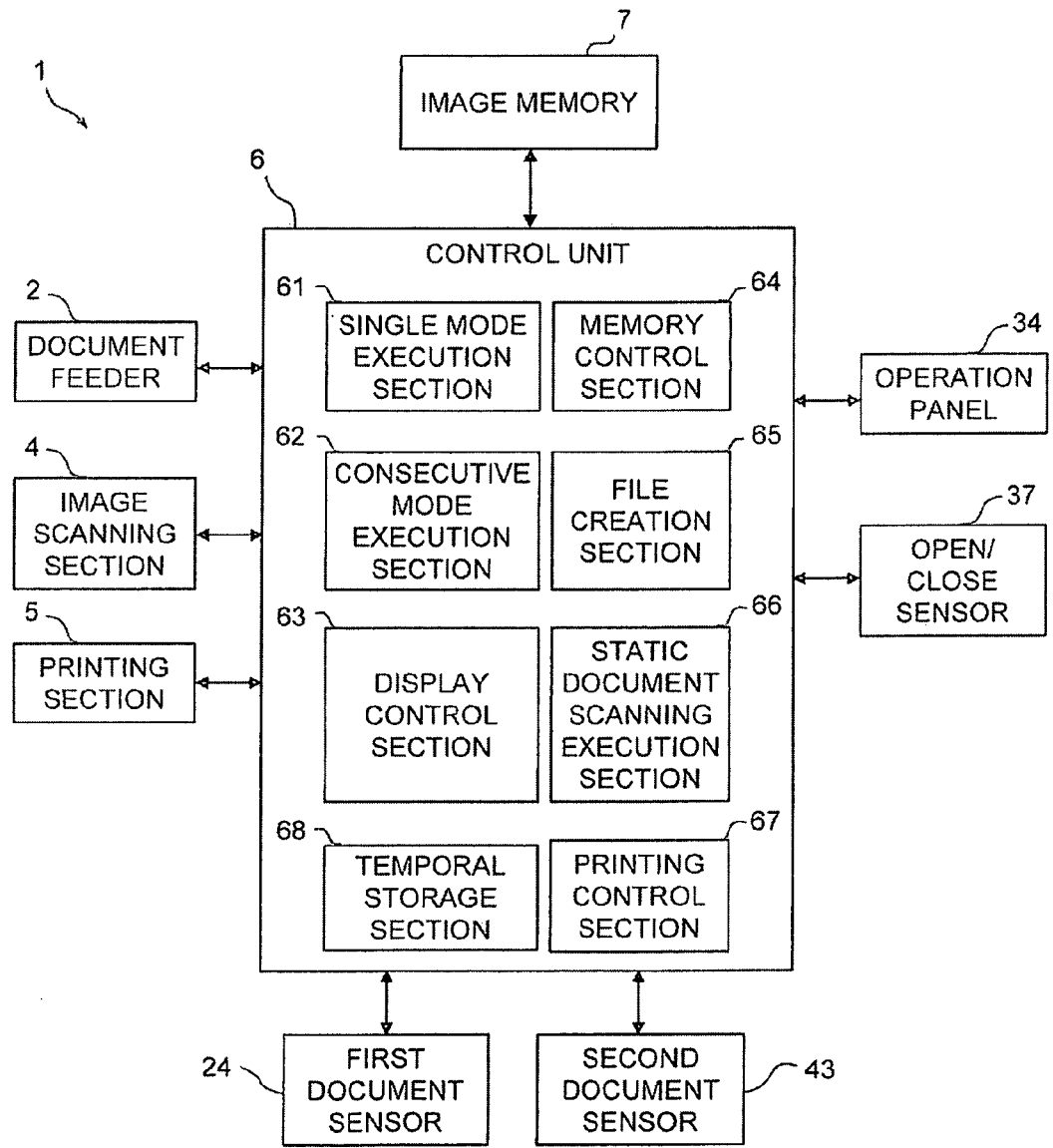
FIG. 4 is a view of a block diagram illustrating the main elements of the MFP.

Control elements of the MFP 1 will be explained with reference to the block diagram of FIG. 4. As illustrated in FIG. 4, the MFP 1 further includes the control unit 6 and an image memory 7.

The control unit 6 is connected to a variety of elements in the MFP 1. The control unit 6 is configured to control the elements. The control unit 6 includes a variety of functional sections. For example, the functional sections are a single mode execution section 61, a consecutive mode execution section 62, a display control section 63, a memory control section 64, a file creation section 65 (file creating section), a static document scanning execution section 66, a printing control section 67, and a temporal storage section 68.

The single mode execution section 61 is configured to execute a single mode by controlling a variety of elements in the MFP 1. The single mode will be explained in the following section A-5-2.

The consecutive mode execution section 62 is configured to execute a consecutive mode by controlling a variety of elements in the MFP 1. The consecutive mode will be explained in the following section A-5-3.

The display control section 63 is configured to display a variety of screens by controlling the LCD panel of the touch panel 34a.

The memory control section 64 is configured to cause the image memory 7 to store a file created by the file creation section 65.

The file creation section 65 is configured to create an electric file based on the image data obtained by the image scanning section 4. Specifically, the file creation section 65 creates a file based on the image data obtained in an after-mentioned series of actions illustrated in FIG. 9 in a period since the start key 34c is firstly pressed until a scan end key K31 (ending reception section) is pressed.

The static document scanning execution section 66 is configured to execute scanning of an image on the static document D2 by causing the carriage driving section 44 to scan entirely the front surface of the static document D2 without allowing the document feeder 2 to perform actions.

The printing control section 67 is configured to cause the printing section 5 to print out the image data.

The temporal storage section 68 is configured to store temporarily the image data obtained by the image scanning section 4. The data stored by the temporal storage section 68 will be used for printing and creating a file.

The functional sections of the control unit 6 will be realized by a central processing unit (CPU) and a storage medium (e.g., a random access memory (RAM) and a read only memory (ROM)). The CPU realizes functions of the functional sections by reading out and running a program stored in the ROM. The RAM is configured to function as a work area of the CPU.

The image memory 7 is a storage device, and is configured to store the image data.

A-5. Actions of Copying

Figure 5:
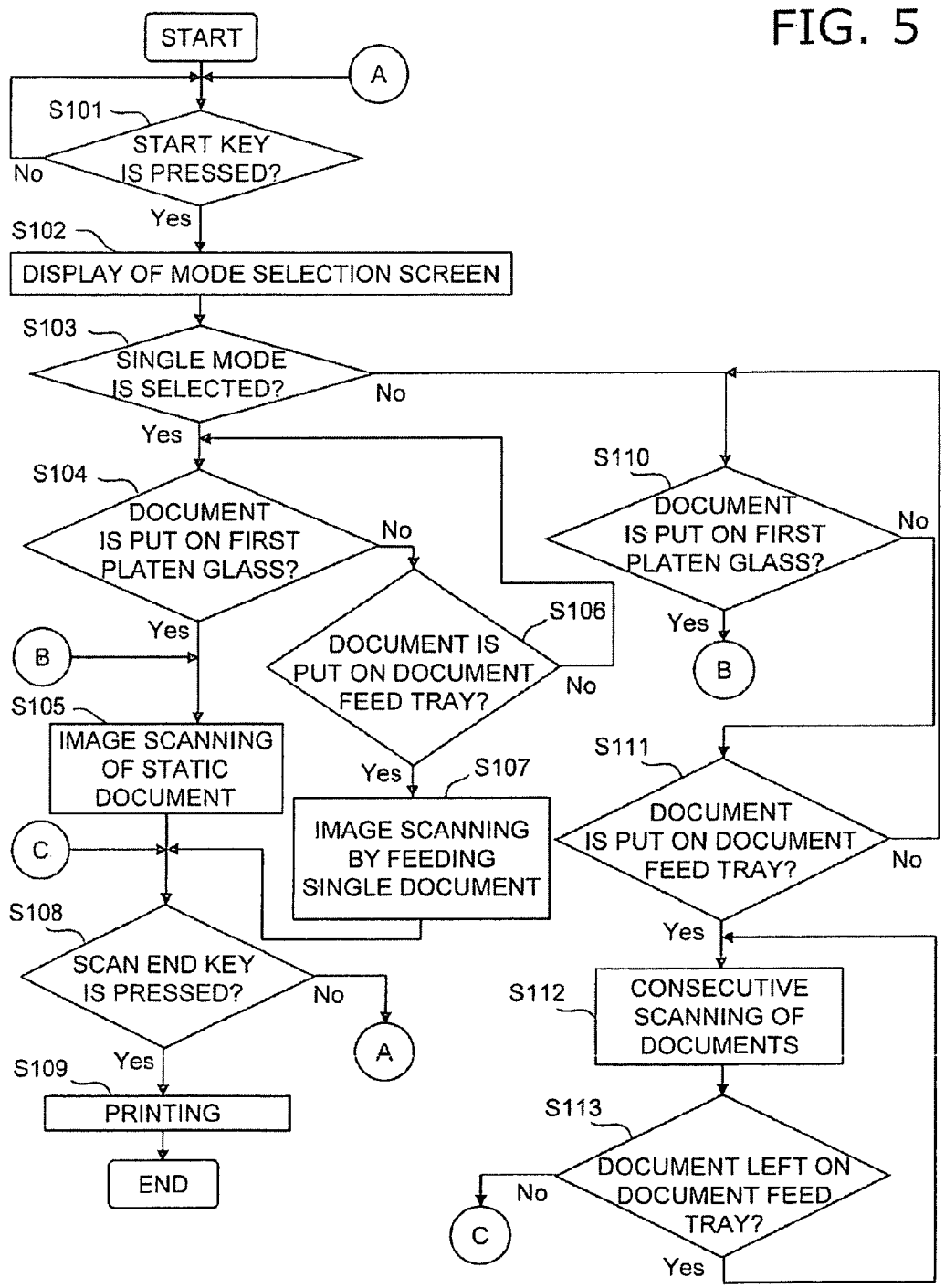
FIG. 5 is a view of a flowchart illustrating an operational flow of the MFP in executing copying.
Figure 6:
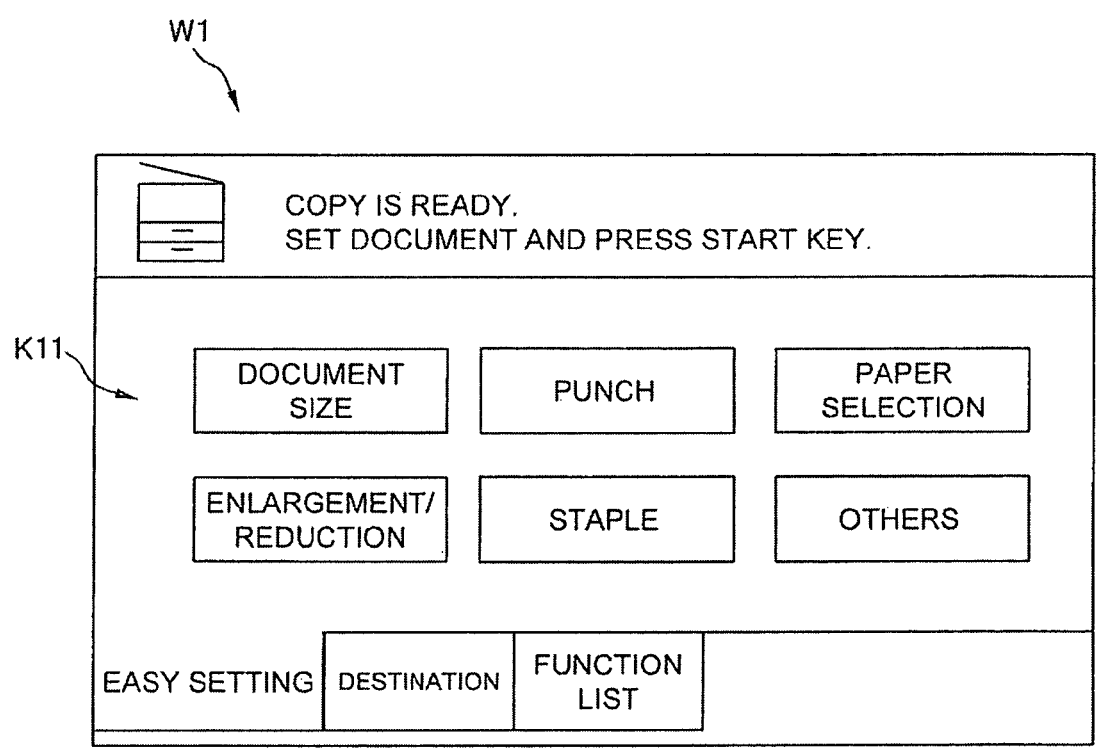
FIG. 6 is a view of a screen shot of a standby screen.
Figure 7:
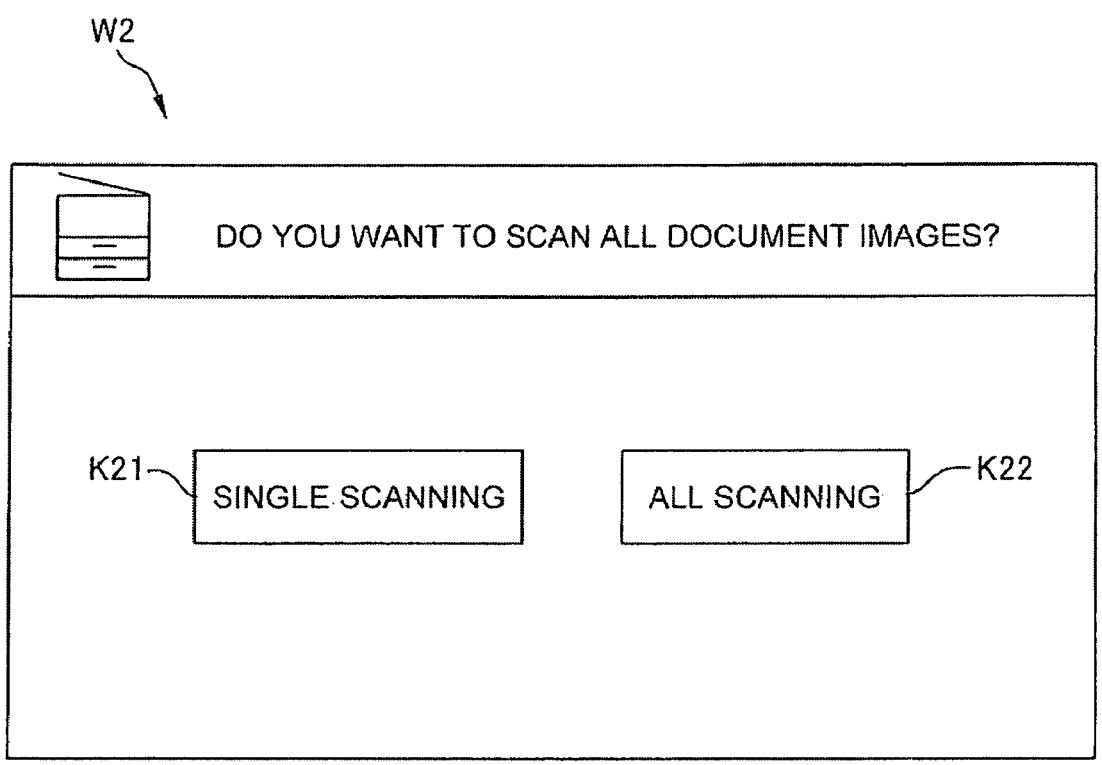
FIG. 7 is a view of a screen shot of a mode selection screen.
Figure 8:
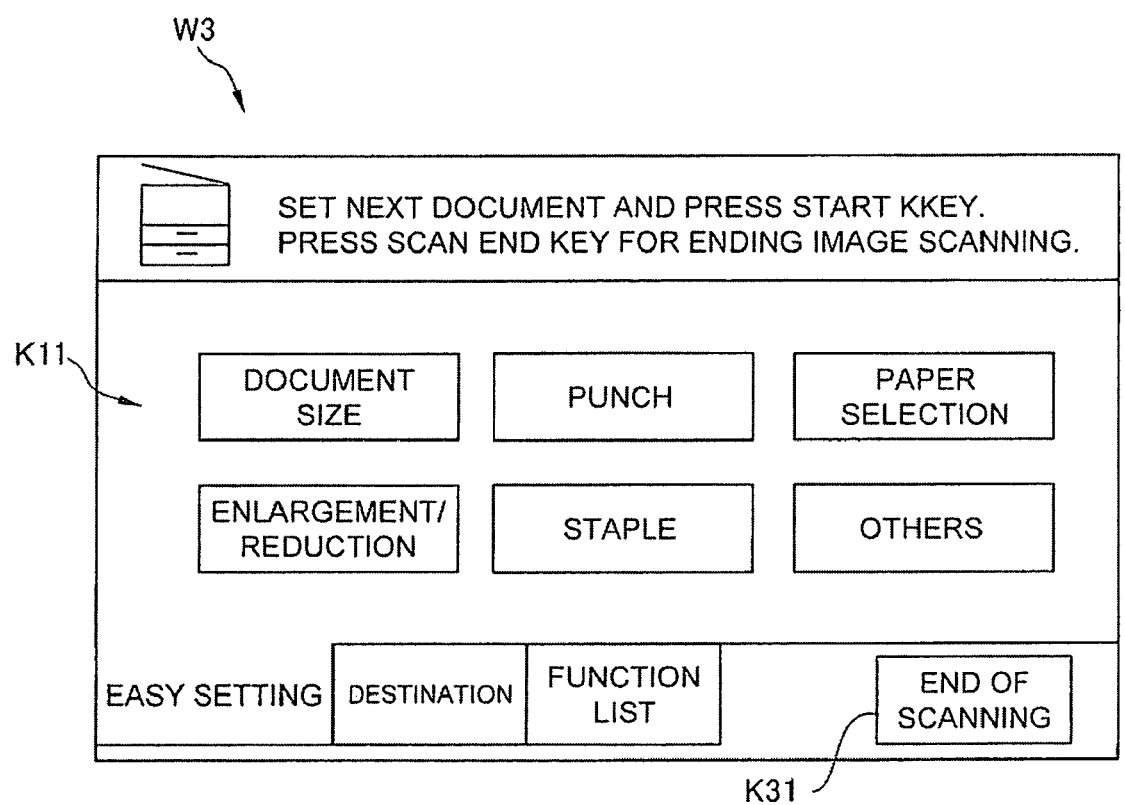
FIG. 8 is a view of a screen shot of a sub-standby screen.

A series of copying actions performed by the MFP 1 will be explained with reference to the above-referred figures and FIGS. 5 to 8. FIG. 5 is a view of a flowchart illustrating an operational flow of the MFP 1 in executing copying. FIGS. 6 to 8 are views of screen shots to be displayed in the operational flow of FIG. 5.

A-5-1. Mode Selection

In a standby condition, the touch panel 34a is configured to display a standby screen W1 under the control of the display control section 63. As illustrated in FIG. 6, a group of copy condition setting keys K11 and messages are displayed on the standby screen W1. For example, the copy condition setting keys K11 include a paper size key, an enlargement/reduction key, and a post-processing key (e.g., stapling). A user's desired copy condition is configured to be received by pressing the keys. Also, the messages include a message asking a user to set a document and press the start key 34c.

As illustrated in FIG. 5, when the start key 34c is pressed (Yes in Step S101), the touch panel 34a displays a mode selection screen W2 under the control of the display control section 63 (Yes in Step S102). As illustrated in FIG. 7, a single mode selection key K21 and a consecutive mode selection key K22 are displayed on the mode selection screen W2.

As illustrated in FIG. 5, when the single mode selection key K21 is pressed (Yes in Step S100), the single mode execution section 61 executes the single mode by activating the document feeder 2 and the image scanning section 4. In the single mode, a plurality of documents D1 on the document feed tray 21 is scanned one by one. On the other hand, when the consecutive mode selection key K22 is pressed (No in Step S103), the consecutive mode execution section 62 executes the consecutive mode by activating the document feeder 2 and the image scanning section 4. In the consecutive mode, all the documents D1 on the document feed tray 21 are consecutively scanned. Details of the single mode and the consecutive mode will be explained in the following paragraphs.

A-5-2 Single Mode

When the detection result of the second document sensor 43 indicates that a static document D2 is put On the first platen glass 35 (Yes in Step S104), the static document scanning execution section 66 causes the image scanning section 4 to scan an image on the document D2 (Step S105). The obtained image data will be temporarily stored in the temporal storage section 68. In this case, the document feeder 2 is suspended under the control of the static document scanning execution section 66.

On the other hand, when the document D2 is not put on the first platen glass 35 (No in Step S104) and the detection result of the first document sensor 24 indicates that a single or plurality of documents D1 is put on the document feed tray 21 (Yes in Step S106), the document feeder 2 feeds a sheet of document D1 and the image scanning section 4 scans an image on the automatic feeding document D1 under the control of the single mode execution section 61 (Step S107). The obtained image data are stored in the temporal storage section 68.

When the image scanning in Step S105 or S107 is completed, the touch panel 34a displays a sub-standby screen W3 under the control of the display control section 63.

As illustrated in FIG. 8, the copy condition setting key K11 and the scan end key K31 are displayed on the sub-standby screen W3 just the same as the standby screen W1. Also, messages are displayed on the sub-standby screen W3. The messages include a message asking a user to set the next document and press the start key 34c if the user wants to continue scanning of a document and a message asking the user to press a scan end key if the user wants to end scanning of a document.

When the scan end key K31 is pressed (Yes in Step S108), printing is executed as described in the following paragraphs.

On the other hand, when the user presses the start key 34c without pressing the scan end key K31 (No in Step S108 and then Yes in Step S101), the mode selection screen W2 is displayed and the subsequent actions are executed again (Step S102 and subsequent Steps).

Also, in the single mode, when the open/close sensor 37 detects that the feeder housing 20 is away from the main body housing 30 (i.e., set in the opposed position) while a document is fed, the control unit 6 is configured to suspend actions of the document feeder 2 and the image scanning section 4. When the document is not being fed, that is, before or after the feeding of the document, the control unit 6 does not suspend actions of the document feeder 2 and the image scanning section 4 even if the open/close sensor 37 detects that the feeder housing 20 is set in the opened position.

A-5-3. Consecutive Mode

In the consecutive mode, when the static document D2 is put on the first platen glass 35 (Yes in Step S110), Step S105 and subsequent Steps are executed and processing of image scanning and the like are executed with respect to the document D2.

On the other hand, when the document D2 is not put on the first platen glass 35 (No in Step S110) and a single or plurality of documents D1 is put on the document feed tray 21(Yes in Step S111), the document feeder 2 sequentially feeds all the documents D1 on the document feed tray 21 and the image scanning section 4 consecutively scans images on the automatic feeding document D1 under the control of the consecutive mode execution section 62 (Step S112). The obtained image data are sequentially stored in the temporal storage section 68.

The scanning is consecutively executed until all the documents D1 are fed from the document feed tray 21 (Yes in Step S113 and then Step S112). When all the documents D1 are scanned (No in Step S113), Step S108 and subsequent Steps are executed. In other words, when the scan end key K31 is pressed (Yes in Step S108), the printing section 5 executes printing as described in the following paragraphs (Step S109).

On the other hand, when the user presses the start key 34c without pressing the scan end key K31 (No in Step S108 and then Yes in Step S101), the mode selection screen W2 is displayed and the subsequent processing are executed again as described above (Step S102 and the subsequent Steps).

Note that when the open/close sensor 37 detects that the feeder housing 20 is set in the opened position with respect to the main body housing 30 during the feeding of the document D1 in Step S112, the control unit 6 causes the document feeder 2, the image scanner 4, and the like to stop performing actions.

A-5-4. Printing

As illustrated in FIG. 5, when the scan end key K31 is pressed (Yes in Step S108), the printing section 5 executes printing under the control of the printing control section 67 based on the image data stored in the temporal storage section 68 in a period since the start key 34c is first pressed until the scan end key K31 is pressed (Step S109).

A-5-5. EXAMPLES

For example, the following case is assumed that a user wants to prepare for a bundle of printed materials by copying 20 sheets of normal documents (i.e., standard-form-sized unstapled document) and a page of a standard-form brochure. More specifically, the user wants to insert a copy of the page of the standard-form brochure between the second and third pages of copies of the normal documents. As described below, the user is able to produce the objective printed materials by operating the MFP 1 with the above-mentioned configuration.

The user puts all the normal documents on the document feed tray 21 while not putting the brochure on the first platen glass 35. Then the user presses the start key 34c. In response to this, the mode selection screen W2 is displayed on the touch panel 34a (Yes in Step S101 and then Step S102). In this case, the user firstly presses the single mode selection key K21 through the mode selection screen W2.

Here, the document D2 is not put on the first platen glass 35 (No in Step S104) and the normal documents are put on the document feed tray 21 as the document D1 (Yes in Step S106). Therefore, when the single mode selection key K21 is pressed (Yes in Step S103), the document feeder 2 is activated and the image scanning section 4 scans an image on the first sheet of the normal documents under the control of the single mode execution section 61 (Step S107). Then, the sub-standby screen W3 is displayed on the touch panel 34a.

When the user presses the start key 34c through the sub-standby screen W3 (No in Step S108 and then Yes in Step S101), the mode selection screen W2 is displayed on the touch panel 34a (Step S102). When the user presses the single mode selection key K21 through the mode selection screen W2 (Yes in Step S103), the document feeder 2 feeds the second sheet of the normal documents and the image scanning section 4 scans an image of the second document under the control of the single mode execution section 61 (No in Step S104, Yes in Step S106, and then Step S107).

Next, the sub-standby screen W3 is displayed on the touch panel 34a. The user sets the feeder housing 20 in the opened position with respect to the main body housing 30. Then, the user puts the brochure on the first platen glass 35 while the objective page of the brochure faces down. Subsequently the user sets the feeder housing 20 in the closed position, and presses the start key 34c. In response to this (No in Step S108 and then Yes in Step S101), the mode selection screen W2 is displayed on the touch panel 34a (Step S102). The user is herein able to select either the single mode or the consecutive mode by pressing either the single mode selection key K21 or the consecutive mode selection key K22 through the mode selection screen W2.

Regardless of which keys are pressed, the document feeder 2 is not herein activated and the image scanning section 4 scans the document D2 on the first platen glass 35 in priority to the normal documents on the document feed tray 21 under the control of the static document scanning execution section 66 (Yes in Step S104 or S110 and then Step S105). Then the sub-standby screen W3 is displayed on the touch panel 34a.

In this case, the user presses the start key 34c through the sub-standby screen W3 while removing the brochure from the first platen glass 35. In response to this (No in Step S108 and then Yes in Step S101), the mode selection screen W2 is displayed on the touch panel 34a (Step S102). When the user presses the consecutive mode selection key K22 through the mode selection screen W2 (No in Step S103), the document feeder 2 feeds all the rest of normal documents on the document feed tray 21 and the image scanning section 4 sequentially scans images on the fed normal documents under the control of the consecutive mode execution section 62 (No in Step S110, Yes in Step S111 and then Step S112).

When the scanning is completed (No in Step S113), the sub-standby screen W3 is displayed on the touch panel 34a.

When the user presses the scan end key K31 through the sub-standby screen W3 (Yes in Step S108), the printing section 109 prints the image data of 21 sheets of documents (i.e., 20 sheets of normal documents and a page of brochure) onto 21 sheets of printing paper based on the image data stored in the temporal storage section 68 (Step S109).

A-6. Actions in Image File Creation

Figure 9:
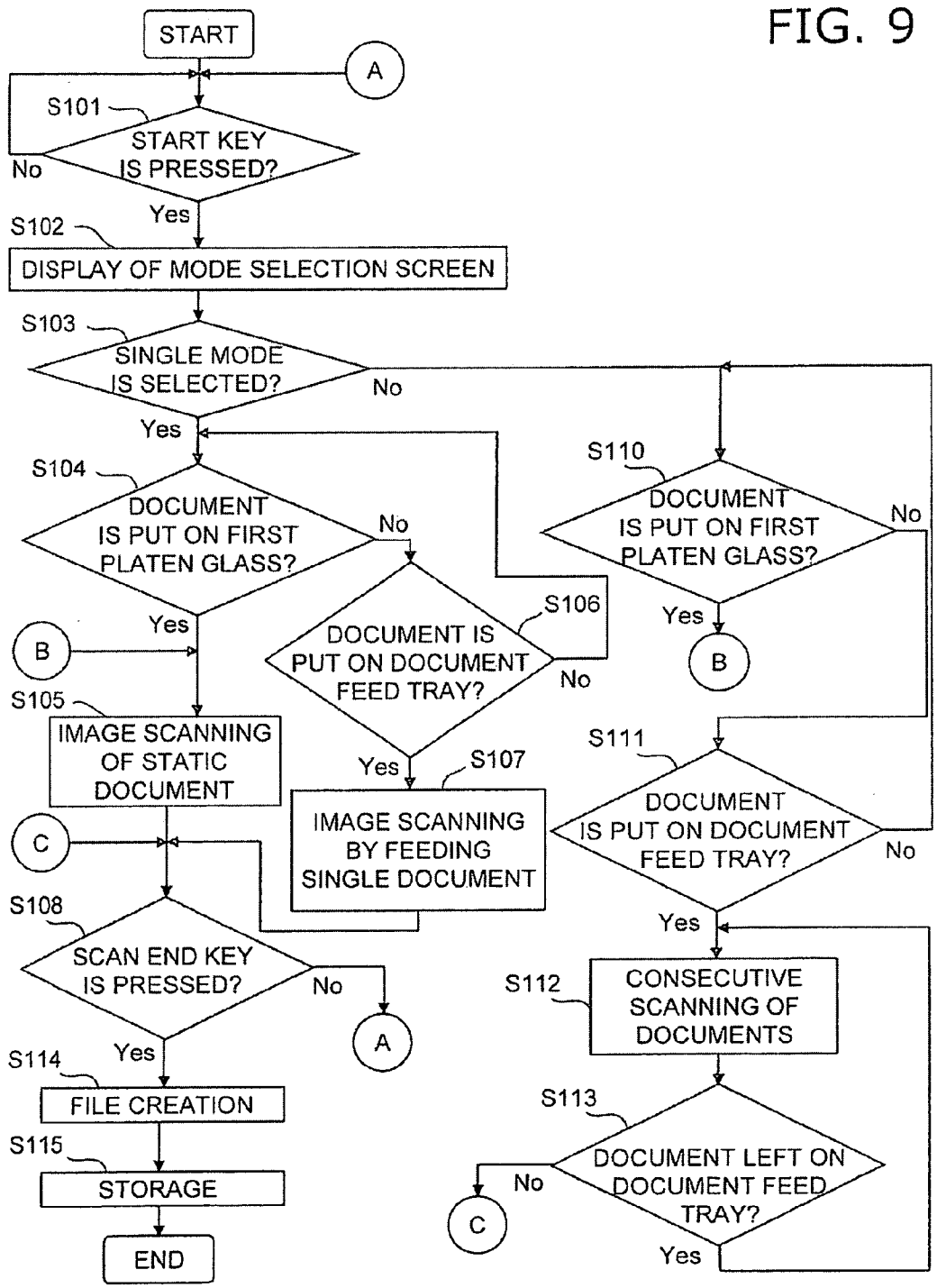
FIG. 9 is a view of a flowchart illustrating an operational flow of the MFP in executing image scanning.

When the scanner key of the function selection keys 34d is pressed, the MFP 1 executes image scanning without printing and storage of the scanned image. FIG. 9 illustrates a flowchart regarding a series of actions performed in the image scanning.

Steps in the flowchart of FIG. 9 are the same as those in the flowchart of copying operation in FIG. 5 except that Steps S114 and S115 are added instead of Step S109 in FIG. 5. In other words, the printing control section 67 does not cause the printing section 5 to perform printing. Also, the file creation section 65 is configured to create an electric file based on the image data stored in the temporal storage section 68 (Step S114). Note that the image data are obtained in a period since the start key 34c is first pressed to start image scanning until the scan end key K31 is pressed. Then, the created file is stored in the image memory 7 under the control of the memory control section 64 (Step S115).

Also, instead of the copy condition setting keys K11, other soft keys are displayed on the standby screen W1 to receive settings of scanning condition. With the above-mentioned actions performed by elements, the memory control section 64 is configured to cause the image memory 7 to store all the image data obtained in image scanning as a single file, even when the single-mode image scanning or the consecutive-mode image scanning is executed twice or more during a series of scanning actions or even when a combination of the single and consecutive modes is executed.

In this case, the file creation section 65 is configured to create a file based on the image data of 21 sheets of documents obtained in a period since an image on the first sheet of the normal documents is scanned until the scan end key K31 is pressed. Then, the memory control section 64 causes the image memory 7 to store the created file.

The stored file is printed out in accordance with a user's instruction or is transmitted to an external apparatus through a communication section (not illustrated in the figure).

As explained with reference to FIGS. 5, 9, and the like, the MFP 1 is configured to feed and to scan a single or plurality of documents one by one when the single mode is executed. Accordingly, the MFP 1 is allow a user to confirm whether or not contents, orientation, and order of the documents on the document feed tray 21 are appropriate before feeding them. Furthermore, a user does not have to put the documents on the first platen glass 35 one by one. Consequently, the MFP 1 is configured to prevent effectively failure in scanning and/or copying without burdening a user with excessive tasks. Also, even when failure occurs, a user easily notices it because he/she confirms the documents one by one.

Furthermore, the MFP 1 is configured to execute selectively either the single mode or the consecutive mode in accordance with a user's instruction. Accordingly, a user is able to select preferentially either prevention of a scanning failure or speedy scanning.

Also, according to the MFP 1, the image scanning section 4 is configured to scan an image on the document put on the platen glass 35 under the control of the static document scanning execution section 68. Therefore, even when the document feeder 2 is not configured to feed some sort of document (e.g., document of special size/shape), it is possible to scan an image on the document.

Furthermore, the MFP 1 is configured to save the user's tasks. The following is an example.

When a document has a special shape or thickness, a document feeder may not be capable of feeding it. If a user wants to obtain image data or printed materials from a bundle of documents with the conventional image scanner and copier while a sheet of special document is inserted in a large number of normal documents in the bundle of documents, the user has been required to sort preliminarily the documents in an appropriate order, edit the obtained image data, or sort the printed materials in an appropriate order.

In short, according to the conventional apparatuses, in order to obtain a bundle of copied materials of desired order, a user is required to repeat a series of operations of: dividing the normal documents into two groups based on the inserted page of the special document and then sorting the groups respectively; setting either of the groups in the document feeder and then copying them with the automatic feeding function; and putting the special document on the platen glass and copying it.

Also, according to the conventional copier, a user is capable of setting all the normal documents in the document feeder and copying them with the automatic feeding function while the user is capable of putting a special document on the platen glass and separately copying it from the normal documents. However, a user is required to sort manually the copied materials by inserting a copy of the special document between desired pages of copies of the normal documents.

The task of sorting documents and/or copied materials is bothersome for a user.

However, according to the MFP 1 with the static document scanning execution section 66, it is possible to scan an image on the document to be fed by the document feeder 2 and an image on the document on the platen glass 35 in a series of processing. In short, a user is just required to set all the automatically-feedable documents in the document feeder 2 and to operate the operation panel 34. Accordingly, the user is able to group the documents on the document feed tray 21 into a plurality of groups without dividing the documents into a plurality of bundles and separately setting them.

Consequently, the MFP 1 is configured to provide a user with a bundle of copied materials while a copy of the special document is inserted in desired pages of copies of normal documents in accordance with a user's instruction. Furthermore, the user does not have to perform tasks of preliminarily sorting the documents or the printed materials and the like.

Other Embodiments

Other embodiments will now be explained. In view of the similarity between the first and other embodiments, the parts of the other embodiments that are identical to the parts of the first embodiment will be given the same reference numerals as the parts of the first embodiment. Moreover, the descriptions of the parts of the other embodiments that are identical to the parts of the first embodiment may be omitted for the sake of brevity.

B. Second Embodiment

Figure 10:
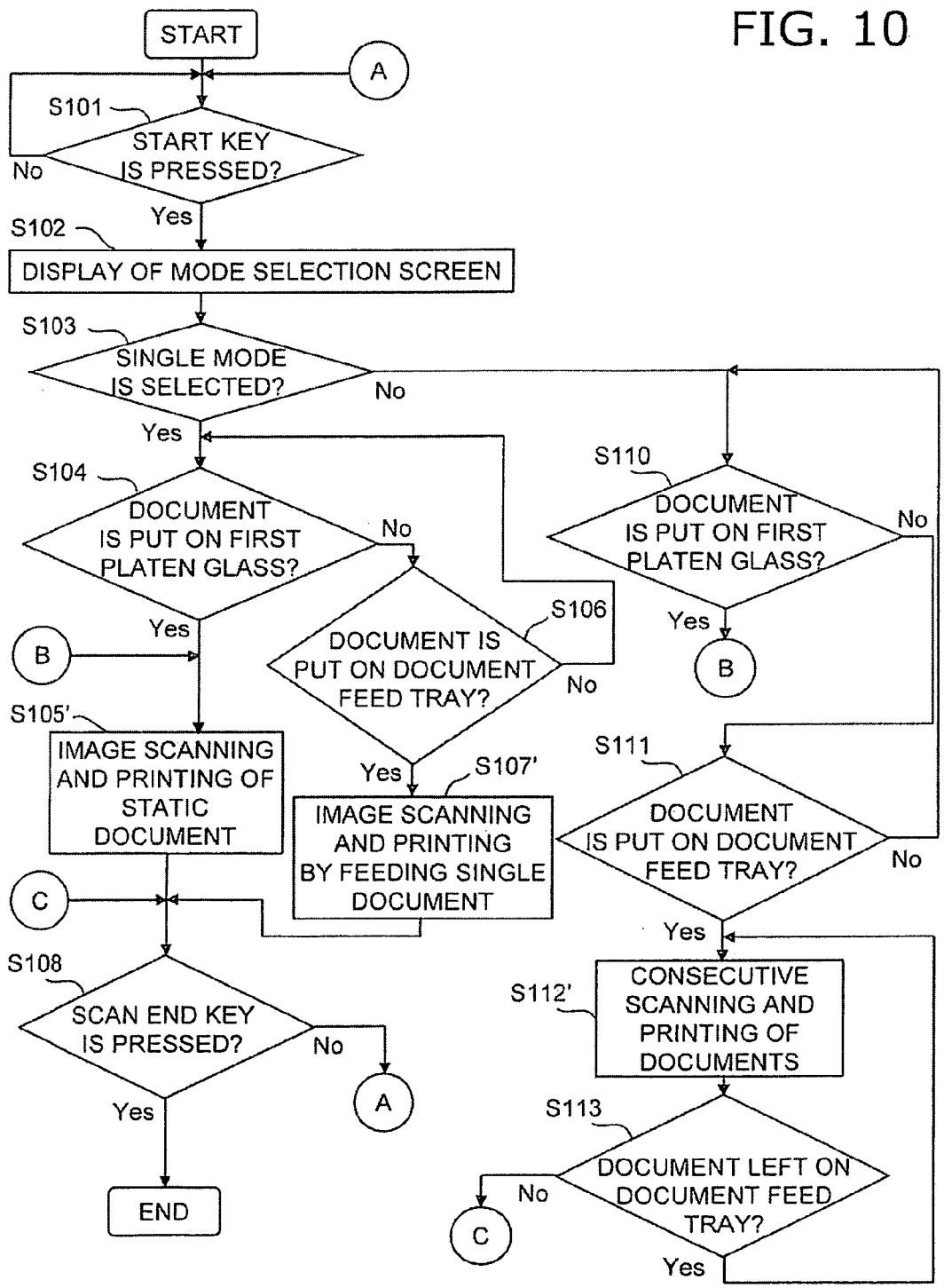
FIG. 10 is a view of a flowchart illustrating an operational flow of an MFP according to a second preferred embodiment of the present invention.

According to the first embodiment, printing is not executed in copying unless the scan end key K31 is pressed. However, according to the second embodiment, printing of image data will be executed every time image data are obtained from a sheet of a document. FIG. 10 illustrates actions to be performed in the second embodiment.

Steps of the flow chart in FIG. 10 are the same as those in FIG. 5 except that the printing control section 67 of the MFP 1 executes Steps S105' and S107' in addition to the contents of Steps S105 and S107 in FIG. 5. In short, the printing control section 67 is configured to cause the printing section 5 to print the image data every time the image data are obtained even if the scan end key K31 is not pressed.

C. Third Embodiment

According to the first embodiment, either copying or file storage is selectively executed. However, in the third embodiment, both of them are executed. In short, according to the third embodiment, when a copy key of the function selection keys 34*d* is pressed, a series of actions illustrated in a flowchart of FIG. 11 are executed.

Figure 11:
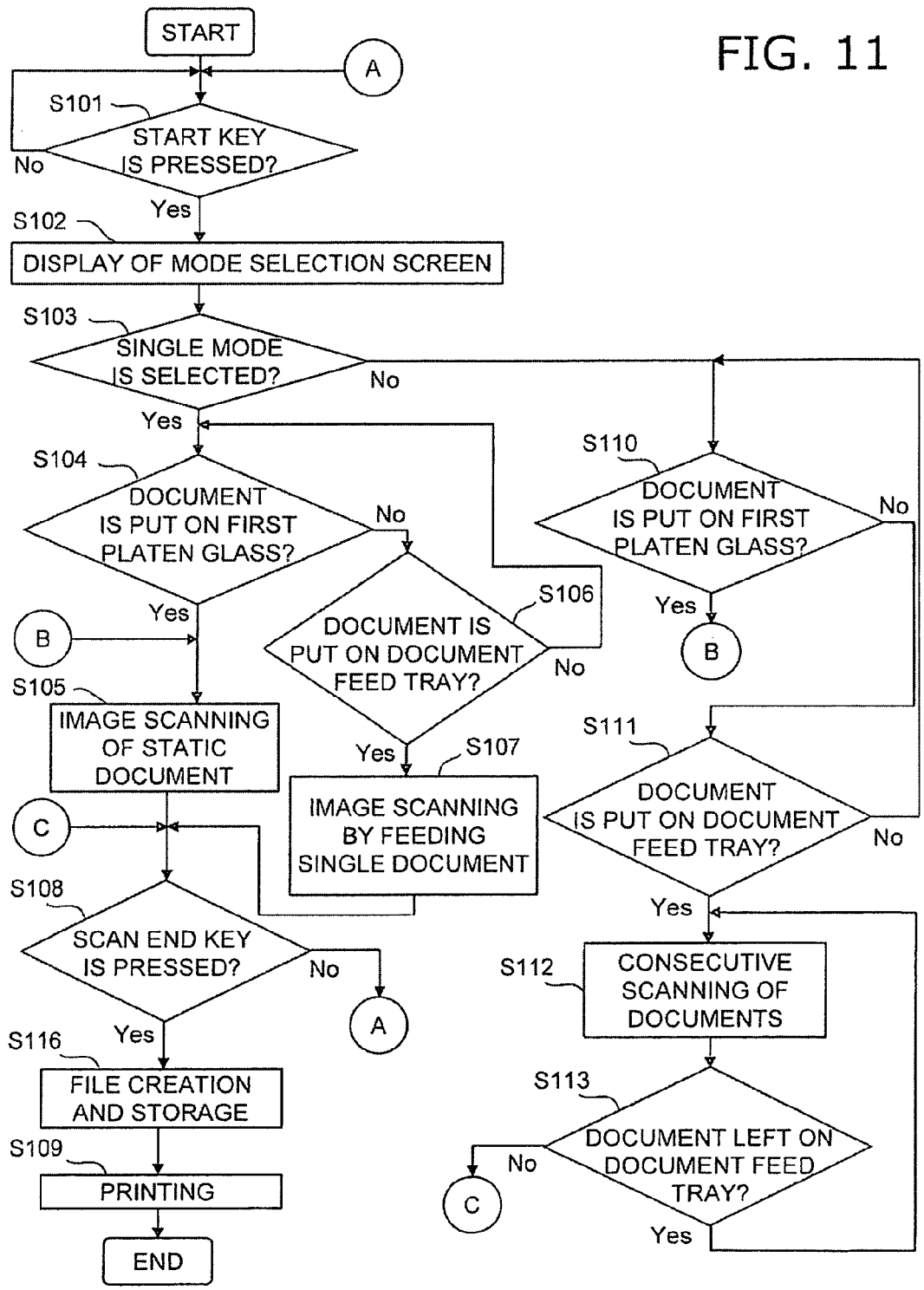
FIG. 11 is a view of a flowchart illustrating an operational flow of an MFP according to a third preferred embodiment of the present invention.

Steps of the flowchart in FIG. 11 are the same as those in FIG. 5 except that Step S116 for creating a file and storing the file is added before Step 109 in FIG. 5. Also, file creation and file storage are similarly executed as explained above for Steps S114 and S115 in FIG. 9.

D. Alternate Embodiments

Example (a)

The start key 34*c* is only an example of a start reception section to receive an instruction of starting image scanning from a user. Note that the start reception section may be realized by the touch panel 34*a*.

Example (b)

The touch panel 34*a* is only an example of a selection reception section to receive an instruction of executing either the single mode or the consecutive mode from a user. Note that the selection reception section may be realized by hard keys.

Example (c)

The image scanning section 4 is only an example of the first and second scanning sections and is configured to scan the document to be fed by the document feeder 2 and the document on the platen glass 35. Note that the first scanning section and the second scanning section may be separately provided.

Example (d)

The above-mentioned embodiments may be suitably combined.

General Interpretation

A used herein, the following directional terms "forward, rearward, above, downward, vertical, horizontal, below and transverse" as well as any other similar directional terms refer to those directions of a device equipped with the present invention. Accordingly, these terms, as utilized to describe aspects of the present invention, should be interpreted relative to a device equipped with the present invention.

The term "configured" as used herein to describe a component, section or part of a device includes hardware and/or software that is constructed and/or programmed to carry out the desired function.

Terms that are expressed as "means-plus function" in the claims should include any structure that can be utilized to carry out the function of that part of the present invention.

The term "comprising" and its derivatives, as used herein, are intended to be open ended terms that specify the presence of the stated features, elements, components, groups, integers, and/or steps, but do not exclude the presence of other unstated features, elements, components, groups, integers, and/or steps. The foregoing also applied to words having similar meanings such as the terms, "including," "having," and their derivatives. Also, the term "part," "section," "portion," "member," or "element" when used in the singular can have the dual meaning of a single part or a plurality of parts.

The terms of degree such as "substantially", "about," and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments

What is claimed is:

1. An image scanner, comprising:
    a document feeder being configured to move a sheet of a document;
    a first scanning section being configured to scan an image on the sheet during movement of the document;
    a platen configured to receive the sheet of the document thereon;
    a second scanning section arranged to scan an image on the document placed on the platen;
    a document sensor configured to detect the document placed on the platen;
    a static document scanning execution section configured to cause the second scanning section to scan the image on the document placed on the platen without activating the document feeder when the document sensor detects existence of the document put on the platen;
    a start reception section being configured to receive an instruction to start scanning the image on the document from a user;
    a single mode execution section being configured to execute a single mode, the single mode being configured to cause the document feeder to move the sheet of the document and cause the first scanning section to scan the image on the sheet every time the start reception section receives the start instruction;
    a consecutive mode execution section being configured to execute a consecutive mode, the consecutive mode being configured to cause the document feeder to move the sheet and cause the first scanning section to scan images consecutively on a plurality of documents, respectively, when the start reception section receives the start instruction;
    a selection reception section being configured to receive a user's choice about which of the single mode and the consecutive mode is executed,
    wherein after a start key is pressed, the selection reception section receives an instruction of executing either the single mode or the consecutive mode when a plurality of documents is on the document feeder to select the single mode or the consecutive mode, and
    wherein when the selection reception section receives the instruction of executing the single mode and the document sensor detects the document placed on the platen, the second scanning section scans the image on the document placed on the platen.

2. The image scanner according to claim 1, further comprising an ending reception section configured to receive an instruction to end scanning of the image on the document, and a file creating section configured to create a file based on the image data scanned in a period from the start reception section first receives the start instruction until the ending reception section receives the ending instruction.

3. A copier, comprising:
    a document feeder being configured to move a sheet of a document;
    a first scanning section being configured to scan an image on the sheet of the document during movement of the document;
    a platen configured to receive the sheet of the document thereon;
    a second scanning section arranged to scan an image on the document placed on the platen;
    a document sensor configured to detect the document put on the platen;
    a static document scanning execution section configured to cause the second scanning section to scan the image on the document placed on the platen without activating the document feeder when the document sensor detects existence of the document put on the platen;
    a start reception section being configured to receive an instruction to start scanning the image on the sheet document from a user;
    a single mode execution section being configured to execute a single mode, the single mode being configured to cause the document feeder to move the sheet of the document and cause the first scanning section to scan the image on the sheet of the document every time the start reception section receives the start instruction;
    a printing section being configured to print the image scanned by the first scanning section on a sheet of paper;
    a consecutive mode execution section configured to execute a consecutive mode, the consecutive mode configured to cause the document feeder to move the sheet of the document and cause the first scanning section to scan images consecutively on a plurality of documents, respectively, when the start reception section receives the start instruction; and
    a selection reception section being configured to receive a user's choice about which of the single mode and the consecutive mode is executed,
    wherein after a start key is pressed, the selection reception section receives an instruction of executing either the single mode or the consecutive mode when a plurality of documents is on the document feeder to select the single mode or the consecutive mode, and
    wherein when the selection reception section receives the instruction of executing the single mode and the document sensor detects the document placed on the platen, the second scanning section scans the image on the document placed on the platen.

4. The copier according to claim 3, further comprising an ending reception section configured to receive an instruction to end scanning of the image on the document, and a file creation section configured to create a file based on the image data scanned in a period since the start reception section first receives the start instruction until the ending reception section receives the ending instruction.

* * * * *